Figure 5:
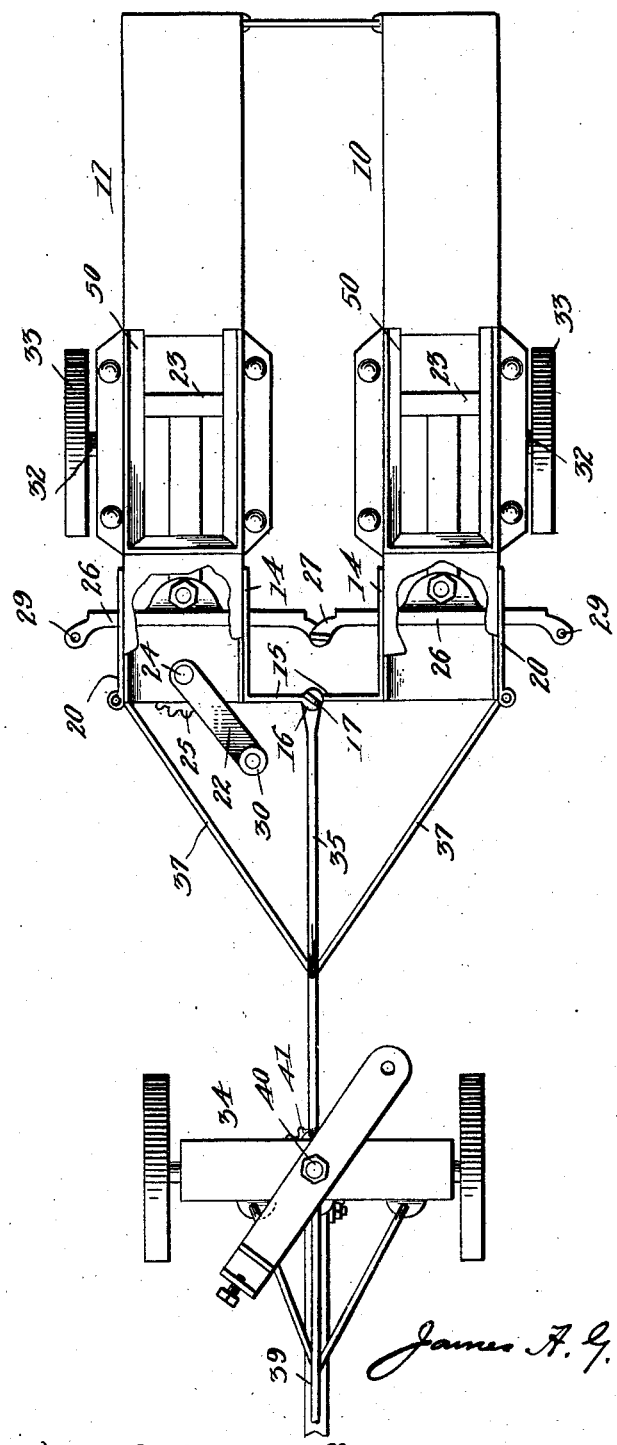

No. 869,251. PATENTED OCT. 29, 1907.
J. A. G. MAXWELL.
BALING PRESS.
APPLICATION FILED MAR. 11, 1907.
3 SHEETS—SHEET 1.
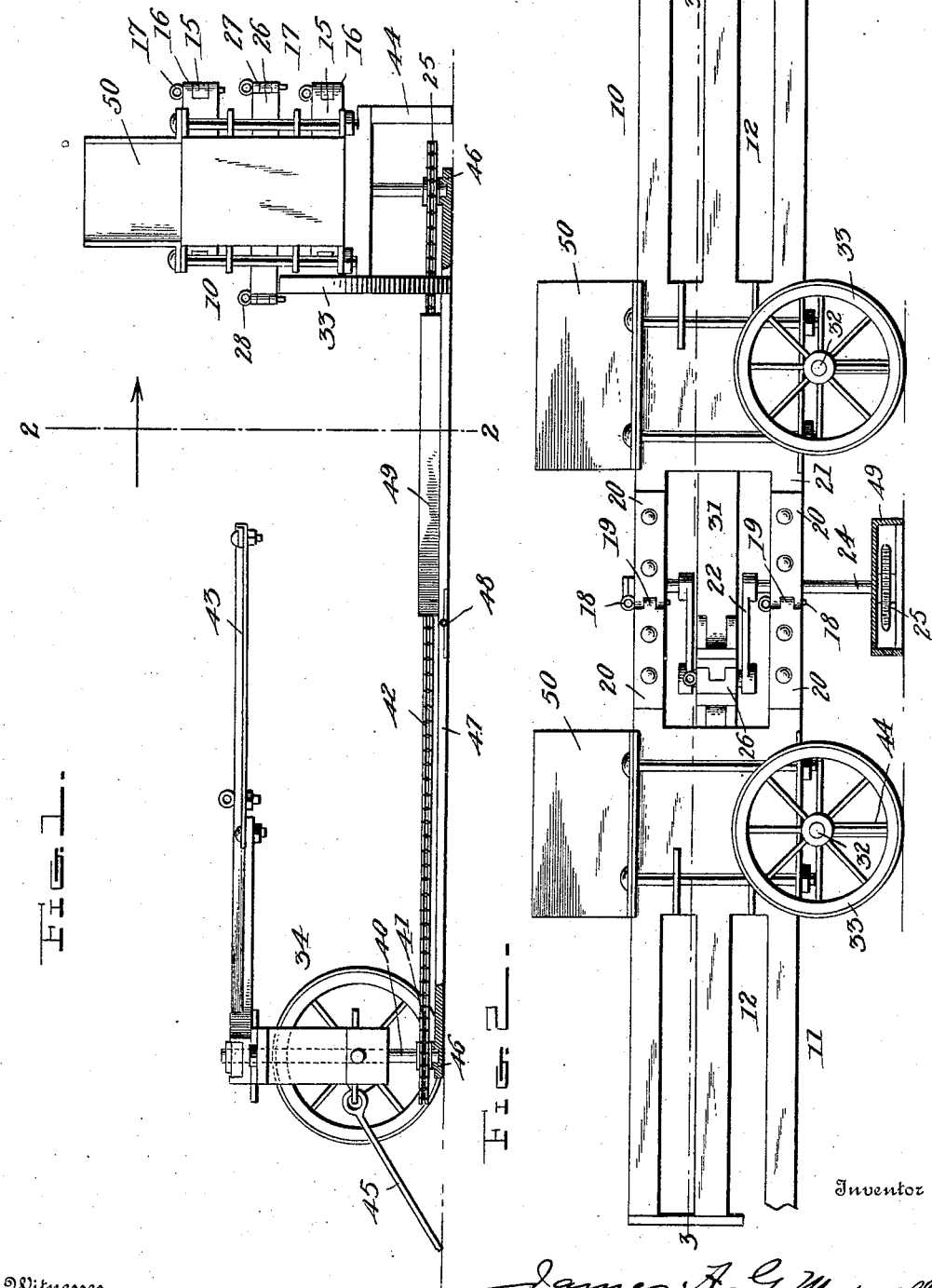
Inventor
James A. G. Maxwell
By
Attorneys
Witnesses

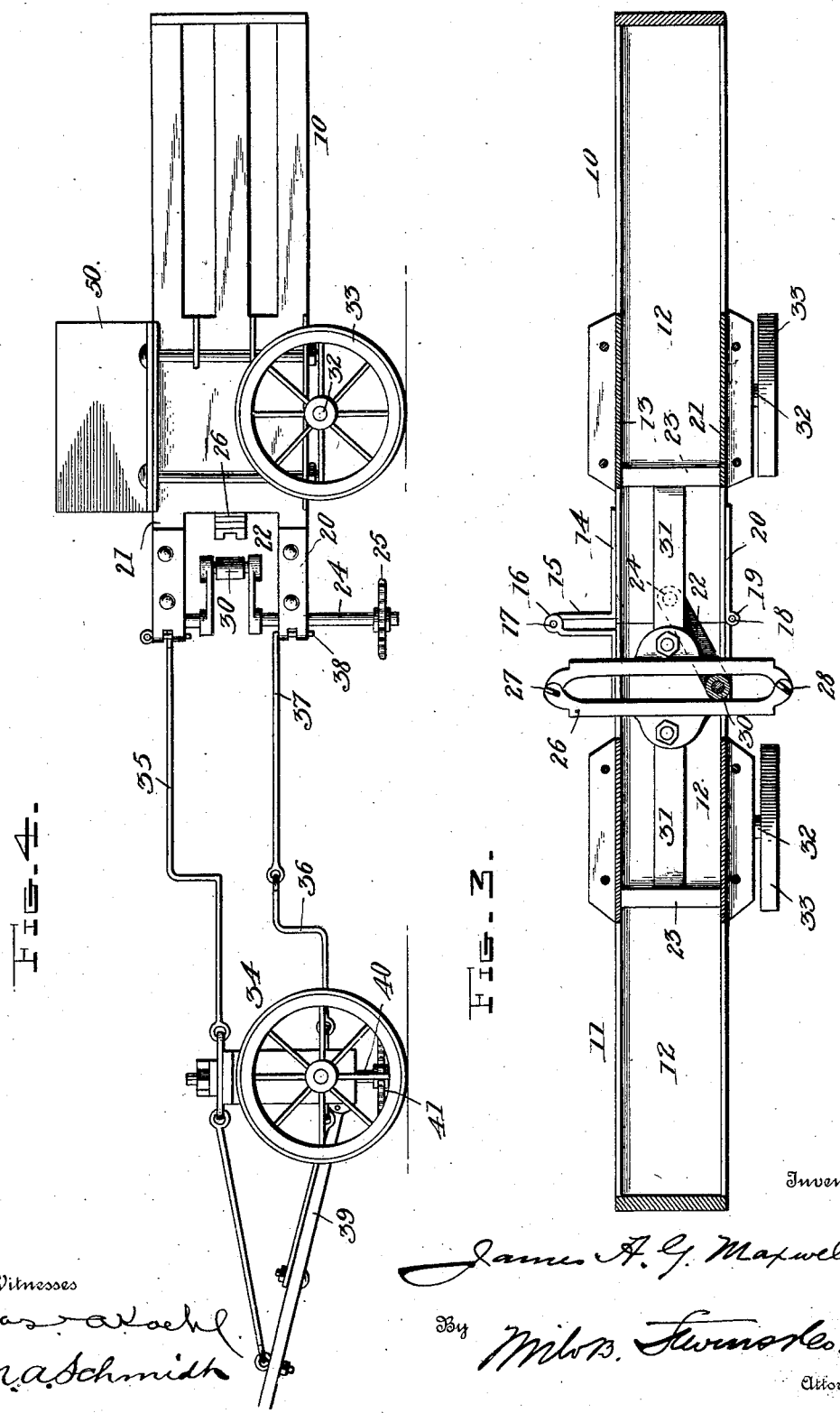

No. 869,251. PATENTED OCT. 29, 1907.
J. A. G. MAXWELL.
BALING PRESS.
APPLICATION FILED MAR. 11, 1907.

3 SHEETS—SHEET 3.

Witnesses

Inventor
James A. G. Maxwell.
By
Attorneys

UNITED STATES PATENT OFFICE.

JAMES A. G. MAXWELL, OF ROME, MISSOURI.

BALING-PRESS.

No. 869,251.    Specification of Letters Patent.    Patented Oct. 29, 1907.

Application filed March 11, 1907. Serial No. 361,749.

*To all whom it may concern:*

Be it known that I, JAMES A. G. MAXWELL, a citizen of the United States, residing at Rome, in the county of Douglas and State of Missouri, have invented certain new and useful Improvements in Baling-Presses, of which the following is a specification.

This invention is a baling-press, and has for its object to provide a machine of this kind, which, when not in use, may be folded into a small and compact form for convenience in transportation and storage.

In the accompanying drawing, Figure 1 is an end view showing the press in operating position. Fig. 2 is a vertical section on the line 2—2 of Fig. 1. Fig. 3 is a horizontal section on the line 3—3 of Fig. 2. Fig. 4 is a side elevation of the press folded and in position for transportation, and Fig. 5 is a top plan view thereof.

Referring specifically to the drawing the press comprises two sections, indicated at 10 and 11, respectively, each of which has a baling-chamber 12. The sections are connected by a hinge-joint in such a manner that they may be placed side by side as shown in Fig. 5. When the press is in operation the sections will be swung around so that the baling chambers are oppositely disposed as shown in Fig. 3.

The hinges of the sections are secured to the side walls 13 thereof near the top and bottom, and comprise leaves 14 having laterally or outwardly extending portions or offsets 15 formed with knuckles 16 to receive the pintles 17. The offset portions 15 are for the purpose of spacing the sections when in folded position. The sections are fastened together when in working position by pins 18 which are inserted into knuckles 19 formed on straps 20 secured to the opposite side walls 21 of the sections at the top and bottom thereof.
Upon withdrawing the pins 18 the sections can be folded as heretofore stated.

Between the top and bottom leaves 14 and the straps 20, the side walls 13 and 21 are cut away to permit the movement of a crank 22 whereby the plungers 23 working in the baling-chambers are operated. The crank is on a vertical shaft 24 journaled in suitable bearings in the top and bottom of the section 11. The shaft extends below the bottom of said section and its lower end is fitted with a sprocket wheel 25. The crank 22 works in a slotted yoke 26 which is in two sections connected at one end by a hinge-joint 27 and at the other end by a removable pin 28 which is inserted into registering openings 29 in the yoke sections. That portion of the crank which works in the slot of the yoke is provided with a roller 30 to reduce friction. The yoke is connected on opposite sides by pitmen 31 to the plungers 23.

Each section 10 and 11 has an axle 32 on which a single wheel 33 is mounted. The wheels are so located that they will be on the outside of the sections when they are in folded position. In order that the machine may be hauled about when in this position I provide a two-wheeled truck 34 which will be coupled to the sections in front thereof by a rod 35 secured at one end to the truck and at the other end to the top hinge of the sections. The truck and sections are also connected by a rod 36 having branches 37 provided with hooked-ends 38 which are inserted into the knuckles 19 of the straps 20. The truck has a pole 39 for the draft animals.

In suitable bearings on the truck 34 is journaled a vertical shaft 40 provided at its lower end with a sprocket-wheel 41 which is adapted to be connected to the sprocket-wheel 25 by a chain 42 when the press is in operation. To the other end of the shaft is fitted the sweep 43 of a horse-power for operating the press. Any other suitable driving means may be employed. When the press is in operation the sections 10 and 11 will be arranged so that the baling-chambers 12 are oppositely disposed as shown in Fig. 3. One side of the sections will be supported by the wheels 33 and the other side will be supported by standards or props 44. The truck will be disconnected from the sections and placed at a suitable distance to one side thereof and anchored by stays 45. Upon connecting the sprocket-wheels 25 and 41 by the chain 42 and placing the sweep 43 in position the machine is ready for operation. The lower ends of the shafts 24 and 40 will be supported in step-bearings 46 on a platform 47 which is placed between the shafts. The platform is in two sections which are connected by a hinge-joint 48 so that they may be folded for convenience in transportation. To prevent the horses operating the sweep from stepping on the chain, that portion of the platform 47 which is in their path is provided with a housing 49 for the chain.

The baling-chambers 12 each have feed-hoppers 50 connected with an opening in the top of the chambers through which the hay or other material to be baled is delivered, and which is alternately pressed into one chamber and then in the other by a reciprocatory movement of the plungers 23 imparted by the crank 22 and the yoke 26.

When the machine is to be transported or stored away, the sweep 43, chain 42, platform 47, props 44 and pins 18 and 28 are removed after which the sections 10 and 11 are folded so as to extend side by side as shown in Fig. 5 with the plungers remaining in their respective baling-chambers. The truck 34 is then coupled to the folded section in a manner already described, whereupon the machine is ready for transportation or storage. With the parts arranged in this manner the machine is considerably shortened and therefore takes up less room which is a convenience in transportation and storage.

I claim:—

1. A sectional baling-press, the sections being foldable beside each other, wheels on which the sections are mounted, and a truck adapted to be coupled to the folded sections.

2. A baling-press having folding sections, each of which has a baling-chamber, a plunger for each baling-chamber, and separable driving means for the plungers.

3. A baling-press having folding sections, each of which has a baling-chamber, a plunger for each baling-chamber, a vertical shaft journaled on one of the sections, and having a crank, a sectional slotted yoke engageable by the crank, and connection between the yoke and the plungers.

In testimony whereof I affix my signature, in presence of two witnesses.

JAMES A. G. MAXWELL.

Witnesses:
B. DEMESSE,
JOS. V. PITTS.